United States Patent
Kaliyannan Eswaran et al.

(10) Patent No.: US 12,055,390 B2
(45) Date of Patent: Aug. 6, 2024

(54) STANDALONE RESOLVER ANGLE VERIFICATION

(71) Applicant: Hamilton Sundstrand Corporation, Charlotte, NC (US)

(72) Inventors: Pravinsharma Kaliyannan Eswaran, Karnataka (IN); Nageswara Rao Kalluri, Karnataka (IN); Surendra Somasekhar Valleru, Karnataka (IN); Sridhar Katakam, Karnataka (IN); Rajkumar Perumal, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 71 days.

(21) Appl. No.: 17/752,939

(22) Filed: May 25, 2022

(65) Prior Publication Data
US 2023/0314119 A1    Oct. 5, 2023

(30) Foreign Application Priority Data
Mar. 30, 2022    (IN) .............................. 202211018924

(51) Int. Cl.
*G01B 7/30* (2006.01)
(52) U.S. Cl.
CPC ....................... *G01B 7/30* (2013.01)
(58) Field of Classification Search
CPC ....................................................... G01B 7/30
See application file for complete search history.

(56) References Cited

U.S. PATENT DOCUMENTS

| 4,298,874 A * | 11/1981 | Kuipers | .................... G01S 1/42 |
| | | | 342/463 |
| 7,863,850 B2 | 1/2011 | Fu et al. | |
| 7,977,936 B2 * | 7/2011 | Lillestolen | .......... H03M 1/1225 |
| | | | 324/207.25 |

(Continued)

FOREIGN PATENT DOCUMENTS

| JP | H0212014 A | 1/1990 |
| JP | H0555006 U | 7/1993 |
| JP | 4669859 B2 | 4/2011 |

OTHER PUBLICATIONS

European Search Report for Application No. 23164464.2, mailed Aug. 8, 2023, 6 pages.

*Primary Examiner* — Reena Aurora
(74) *Attorney, Agent, or Firm* — CANTOR COLBURN LLP

(57) ABSTRACT

A system and method for testing a resolver circuit is provided. Aspects include a resolver circuit including an excitation signal output, a sine signal input, and a cosine signal input, a switching matrix comprising an excitation input connected to the excitation signal output, a first output connected to the sine signal input, and a second output connected to the cosine signal input, wherein the switching matrix further includes a set of switches configured to route an excitation signal from the resolver circuit to mimic a sine and cosine signal output corresponding to a specified angle for a resolver sensor, a controller configured to operate the resolver circuit to output an excitation signal, determine an angle value based on a sine signal received and a cosine signal received from the switching matrix, and compare the angle value to the specified angle to determine a fault condition in the resolver circuit.

20 Claims, 4 Drawing Sheets

---

400 operating a resolver circuit to output an excitation signal to a switching matrix, wherein the switching matrix comprises an excitation input connected to an excitation signal output of the resolver circuit, a first output connected to a sine signal input of the resolver circuit, and a second output connected to a cosine signal input of the resolver circuit, wherein the switching matrix further comprises a set of switches configured to route an excitation signal from the resolver circuit to mimic a sine and cosine signal output corresponding to a specified angle for a resolver sensor
402 determining an angle value based on a sine signal received at the sine signal input and a cosine signal received at the cosine signal input from the switching matrix
404 comparing the angle value to the specified angle for the resolver sensor to determine a fault condition in the resolver circuit
406

(56) References Cited

U.S. PATENT DOCUMENTS

| | | |
|---|---|---|
| 8,825,440 B2 | 9/2014 | Yamada |
| 10,151,605 B2 | 12/2018 | Fujie et al. |
| 10,419,002 B1 | 9/2019 | Lee |
| 2014/0114631 A1 | 4/2014 | Ivchenko et al. |
| 2021/0041508 A1 | 2/2021 | Sadamatsu et al. |
| 2021/0105162 A1 | 4/2021 | Ikenaga et al. |

* cited by examiner

STANDALONE RESOLVER ANGLE VERIFICATION

CROSS-REFERENCE TO RELATED APPLICATIONS

This application claims the benefit of Indian Patent Application No. 202211018924 filed Mar. 30, 2022, which is incorporated herein by reference in its entirety.

BACKGROUND

The present invention generally relates to resolvers, and more specifically to, a standalone resolver angle verification method to achieve high measurement accuracy.

Resolvers are used in a variety of applications to provide position feedback. For example, resolvers are oftentimes associated with actuators to provide feedback regarding the state of the actuator (e.g., open, partially open, closed). A typical resolver includes an excitation coil and first and second secondary coils positioned 90° out of phase with one another. An excitation signal supplied to the excitation coil generates corresponding output signals in the first and second secondary coils. By comparing the phase of the excitation signal to the phase of the output signals, the orientation or position of the resolver shaft can be determined.

Typically, a resolver circuit monitors the excitation signal and the corresponding output signals simultaneously to determine position. However, in some applications, a multiplexer is used to sample the respective signals successively as opposed to simultaneously. For these applications, the resolver position is only determinable within a 90° range. If the resolver position rotates more than 90°, the position cannot be determined without knowledge of the quadrant in which the position is located. For example, a first quadrant may represent angles from 0-90°, the second quadrant represents angles from 90-180°, the third quadrant represents angles from 180-270°, and the third quadrant represents angles from 270-360°. In these applications, the magnitude alone is insufficient to determine position.

BRIEF DESCRIPTION

Embodiments of the present invention are directed to a system. A non-limiting example of the system includes a resolver circuit comprising an excitation signal output, a sine signal input, and a cosine signal input, a switching matrix comprising an excitation input connected to the excitation signal output, a first output connected to the sine signal input, and a second output connected to the cosine signal input, wherein the switching matrix further comprises a set of switches configured to route an excitation signal from the resolver circuit to mimic a sine and cosine signal output corresponding to a specified angle for a resolver sensor, a controller configured to operate the resolver circuit to output an excitation signal to the switching matrix, determine an angle value based on a sine signal received at the sine signal input and a cosine signal received at the cosine signal input from the switching matrix, and compare the angle value to the specified angle for the resolver sensor to determine a fault condition in the resolver circuit.

In addition to one or more of the features described above, or as an alternative, further embodiments of the system may include that the switch matrix operation is controlled by the controller.

In addition to one or more of the features described above, or as an alternative, further embodiments of the system may include that the switch matrix operation is controlled by a manual rotary switch.

In addition to one or more of the features described above, or as an alternative, further embodiments of the system may include that the specified angle is 0 degrees, the sine signal output comprises zero, and the cosine signal output comprises the excitation signal.

In addition to one or more of the features described above, or as an alternative, further embodiments of the system may include that the specified angle is 135 degrees, the sine signal output comprises the excitation signal, and the cosine signal output comprises a negative of the excitation signal.

In addition to one or more of the features described above, or as an alternative, further embodiments of the system may include that the specified angle is 270 degrees, the sine signal output comprises a negative of the excitation signal, and the cosine signal output comprises zero.

In addition to one or more of the features described above, or as an alternative, further embodiments of the system may include that the specified angle is 315 degrees, the sine signal output comprises a negative of the excitation signal, and the cosine signal output comprises the excitation signal.

In addition to one or more of the features described above, or as an alternative, further embodiments of the system may include an isolator connected between the excitation signal output and the excitation input of the switching matrix.

In addition to one or more of the features described above, or as an alternative, further embodiments of the system may include that the isolator comprises an isolation transformer.

In addition to one or more of the features described above, or as an alternative, further embodiments of the system may include that Embodiments of the present invention are directed to a method. A non-limiting example of the method includes operating a resolver circuit to output an excitation signal to a switching matrix, wherein the switching matrix comprises an excitation input connected to an excitation signal output of the resolver circuit, a first output connected to a sine signal input of the resolver circuit, and a second output connected to a cosine signal input of the resolver circuit, wherein the switching matrix further comprises a set of switches configured to route an excitation signal from the resolver circuit to mimic a sine and cosine signal output corresponding to a specified angle for a resolver sensor, determining an angle value based on a sine signal received at the sine signal input and a cosine signal received at the cosine signal input from the switching matrix, and comparing the angle value to the specified angle for the resolver sensor to determine a fault condition in the resolver circuit.

In addition to one or more of the features described above, or as an alternative, further embodiments of the system may include that the specified angle comprises a set of eight test angles.

In addition to one or more of the features described above, or as an alternative, further embodiments of the system may include that the switch matrix operation is controlled by the controller.

In addition to one or more of the features described above, or as an alternative, further embodiments of the system may include that the switch matrix operation is controlled by a manual rotary switch.

In addition to one or more of the features described above, or as an alternative, further embodiments of the system may include that the specified angle is 0 degrees, the sine signal output comprises zero, and the cosine signal output comprises the excitation signal.

In addition to one or more of the features described above, or as an alternative, further embodiments of the system may include that the specified angle is 135 degrees, the sine signal output comprises the excitation signal, and the cosine signal output comprises a negative of the excitation signal.

In addition to one or more of the features described above, or as an alternative, further embodiments of the system may include that the specified angle is 270 degrees, the sine signal output comprises a negative of the excitation signal, and the cosine signal output comprises zero.

In addition to one or more of the features described above, or as an alternative, further embodiments of the system may include that the specified angle is 315 degrees, the sine signal output comprises a negative of the excitation signal, and the cosine signal output comprises the excitation signal.

In addition to one or more of the features described above, or as an alternative, further embodiments of the system may include that an isolator is connected between the excitation signal output and the switching matrix.

In addition to one or more of the features described above, or as an alternative, further embodiments of the system may include that the isolator comprises an isolation transformer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
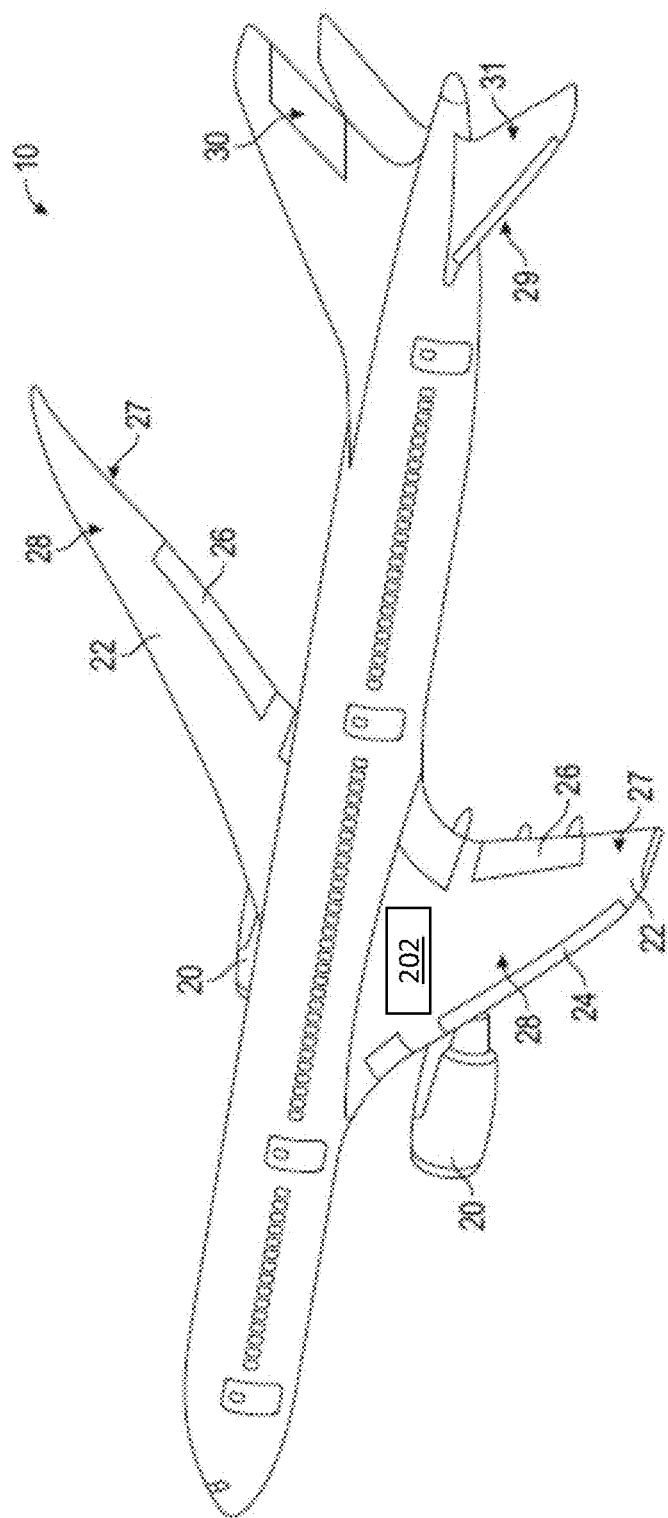
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a resolver interface circuit 202 (described in greater detail in FIG. 2) that measures the angles of a resolver that is used onboard the aircraft 10. These resolver interface circuits 202 need to be tested from time to time to make sure they are functioning correctly.

Turning now to an overview of technologies that are more specifically relevant to aspects of the disclosure, for testing a resolver secondary interface circuit (driver) sine and cosine input channels, two separate sources synchronized to the excitation signal are needed. In typical configurations, a signal generator is utilized, the signal generator includes sophisticated digital to analog converter (DAC) cards interfaced with a processor. With this configuration, the DAC outputs have to be matched for precision with the excitation source for accurate angle verification each time. This synchronization is complex and the error induced can be significantly large. Voltage inaccuracies, frequency limitations and isolation in each DAC channel likewise contributes to additional error potentials. This typical test setup is expensive because of the high end analog to digital conversation (ADC) and DAC cards with waveform processors and software interfaces that are needed.

One or more embodiments described herein address the above described shortcomings of the typical configuration by eliminating the complexities involved in synchronization between excitation from a unit under test (UUT) and the sine and cosine outputs. The UUT herein refers to the resolver secondary interface circuit. In one or more embodiments, this novel configuration uses an isolator and a switch matrix and excitation signal from the UUT to simulate variable angle positions at the resolver secondary interface. The isolator can be an isolation transformer, for example. The switch matrix is built around a multi-pole rotary switch or can be automated with relays. Exact angles can be simulated with a combination of polarity of signals and short conditions at the resolver secondary interface inputs in the UUT. The polarity of the signals and a short condition to the sine and cosine channels can be configured with the assistance of a switch matrix. Benefits of this novel configuration include the elimination of synchronization issues due to a single source being involved. To check the overall range, it is sufficient to measure just a few angles as described later herein.

Figure 2:
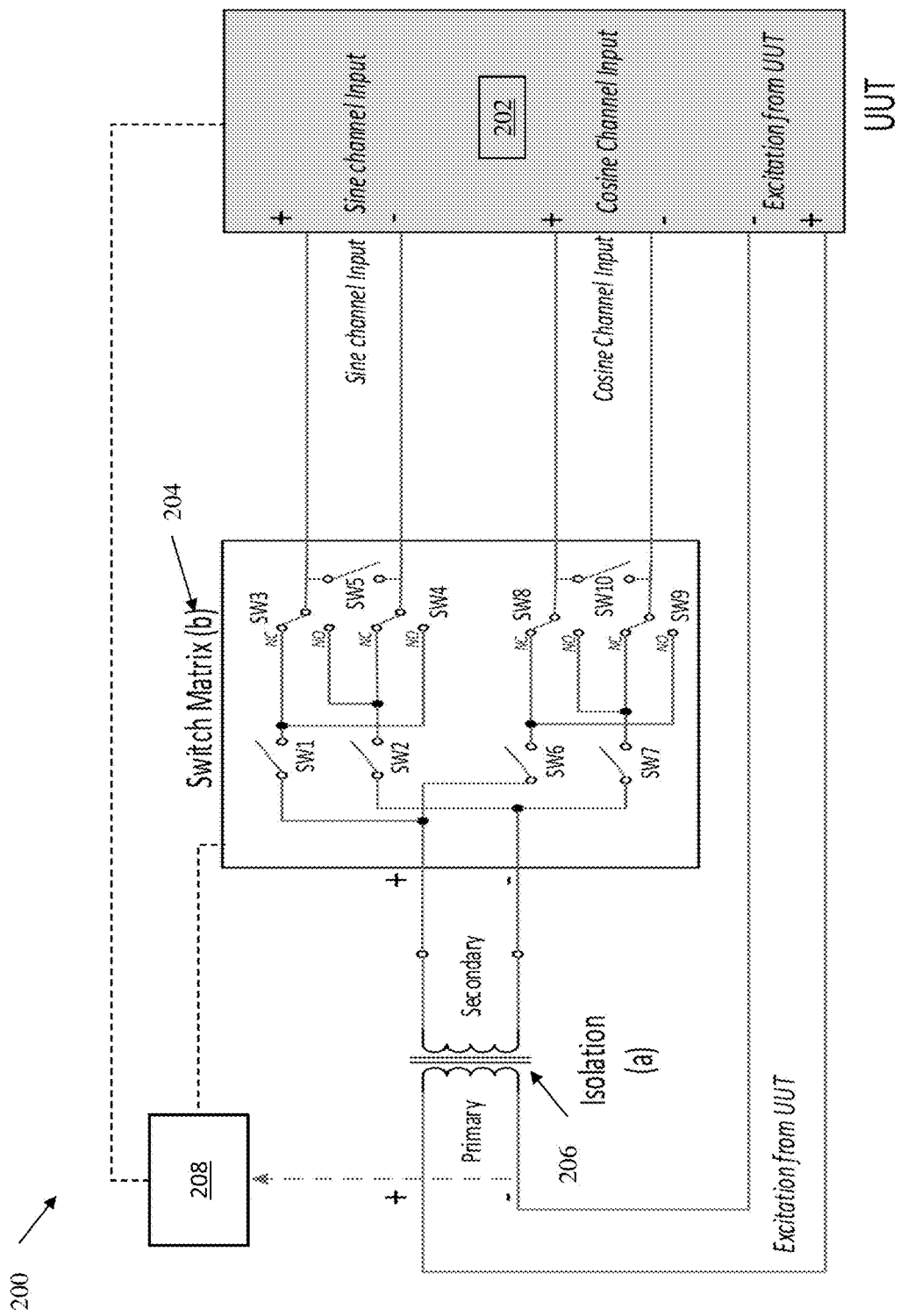
FIG. 2 depicts a diagram of a system for testing a resolver interface circuit according to one or more embodiments.

FIG. 2 depicts a diagram of a system for testing a resolver driver circuit according to one or more embodiments. The system 200 includes a unit under test (UUT) 202. The UUT 202 is a resolver driver circuit that is utilized for determining a resolver angular position. The testing described herein determines whether the excitation signal from the UUT 202 as well as the sine and cosine channel inputs of the UUT 202 are operating correctly. The exact angles of a resolver are mimicked (or simulated) with a combination of polarity of the signals and short conditions performed in the switch matrix 204. The switch matrix 204 includes a first set of switches (SW1-SW5) for controlling the input signal for the sine channel input of the UUT 202. The switch matrix 204 also includes a second set of switches (SW6-SW10) for controlling the input signal for the cosine channel input of the UUT 202. An excitation signal is supplied from the UUT 202 and the channel is connected to an isolator 206. The excitation signal is supplied from a positive terminal and a negative terminal on the UUT. The sine and cosine inputs of the UUT each a positive terminal and negative terminal. With the operation of the switches in the switch matrix 204, a set of angles are mimicked for testing whether the UUT 202 operating properly. It is not necessary to check every angle to verify the quality of the UUT resolver interface. Instead of doing every angle from 0 to 360 degree rotation, the system 200 utilizes a finite set of angles (0, 45, 90, 135, 180, 225, and 270 degrees). For each of the angles described, the switching operation is done according to the following Table 1.

matrix 204 as shown in Table 1. The controller 208 is also utilized for testing by measuring the excitation signal from the UUT 202 and also communicating with the UUT 202 to determine whether the correct signal is received at the sine channel input and the cosine channel inputs.

Figure 3:
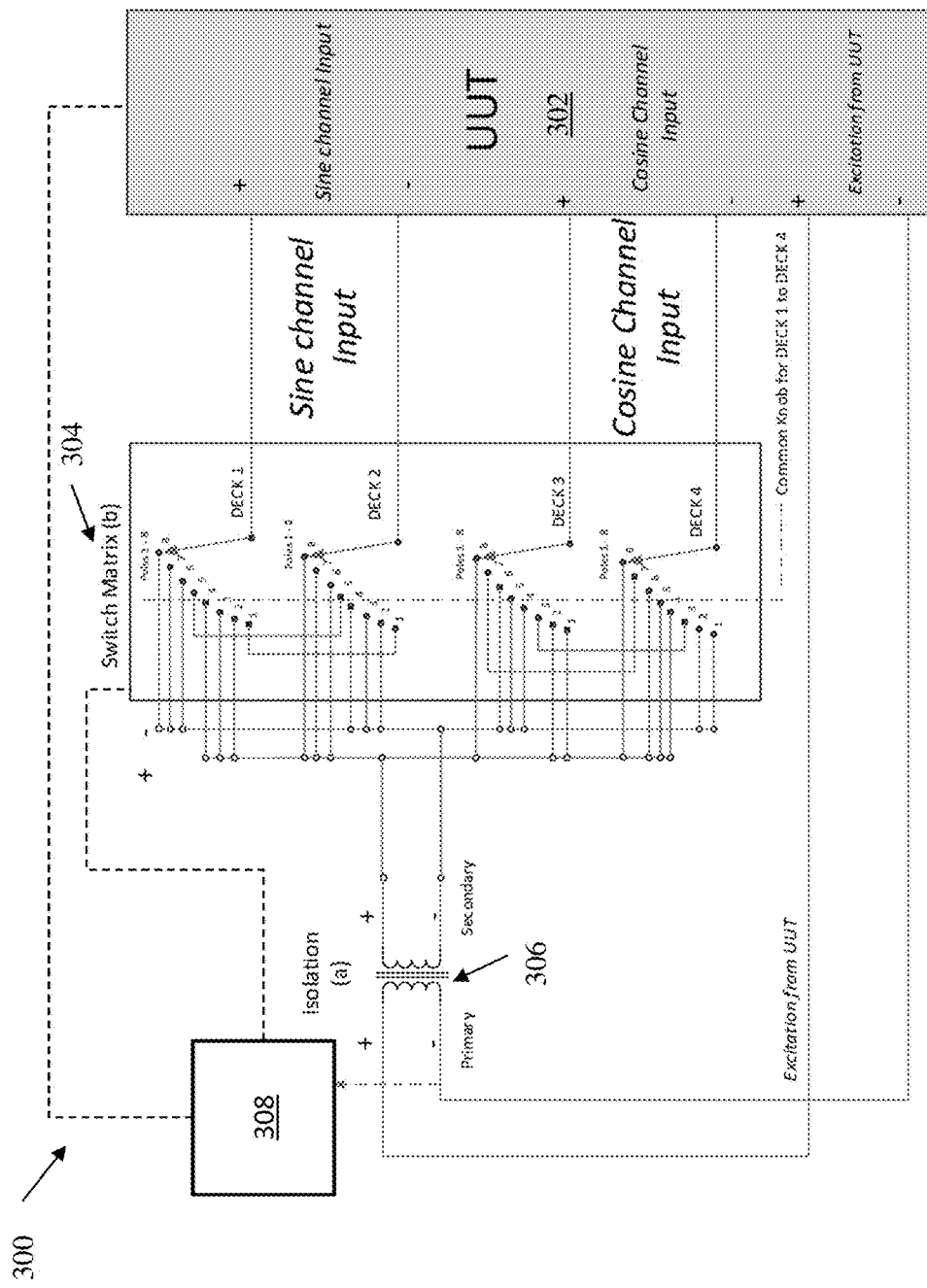
FIG. 3 depicts a diagram of a system for testing a resolver interface circuit according to one or more embodiments.

FIG. 3 depicts a diagram of a system for testing a resolver driver circuit according to one or more embodiments. The system 300 includes a unit under test (UUT) 302. The UUT 302 is a resolver driver circuit that is utilized for determining a resolver angular position. The testing described herein determines whether the excitation signal from the UUT 302

TABLE 1

| Angle | Sine Channel | Cosine Channel | Sine Channel switch configuration ||||| Cosine Channel switch configuration |||||
|---|---|---|---|---|---|---|---|---|---|---|---|---|
| | | | SW1 | SW2 | SW3 | SW4 | SW5 | SW6 | SW7 | SW8 | SW9 | SW10 |
| 0° (360°) | Zero | Excitation+− | OFF | OFF | X | X | ON | ON | ON | NC | NC | OFF |
| 45° | Excitation+− | Excitation+− | ON | ON | NC | NC | OFF | ON | ON | NC | NC | OFF |
| 90° | Excitation+− | Zero | ON | ON | NC | NC | OFF | OFF | OFF | X | X | ON |
| 135° | Excitation+− | Excitation−+ | ON | ON | NC | NC | OFF | ON | ON | NO | NO | OFF |
| 180° (−180°) | Zero | Excitation−+ | OFF | OFF | X | X | ON | ON | ON | NO | NO | OFF |
| 225° (−135°) | Excitation−+ | Excitation−+ | ON | ON | NO | NO | OFF | ON | ON | NO | NO | OFF |
| 270° (−90°) | Excitation−+ | Zero | ON | ON | NO | NO | OFF | OFF | OFF | X | X | ON |
| 315° (−45°) | Excitation−+ | Excitation+− | ON | ON | NO | NO | OFF | ON | ON | NC | NC | OFF |

NC—normally close;
NO—normally open,
X—don't care condition

At 0 degrees, the sine channel is shorted with SW5 being on thus blocking the sine channel signal input. The cosine channel is the excitation signal as SW6, SW7, SW8, and SW9 allow a path from the positive terminal of the excitation channel being connected to the positive terminal of the cosine channel input and the negative terminal of the excitation channel is connected to the negative terminal of the cosine channel input. Similarly, at 45 degrees, the sine channel input will be excitation signals and the cosine channel input will be excitation. At 135 degrees, the sine input will be the excitation signal, however, the cosine will be at negative excitation signal. The cosine has an opposite polarity where the positive cosine input is connected to the negative excitation output and the negative cosine input is connected to the positive excitation output. The remaining angles are described in Table 1 with the corresponding switching operation of the first and second set of switches in the switching matrix 204. The testing is designed to verify the UUT 202 is functioning correctly and with high accuracy at selected resolver angles.

In one or more embodiments, the system 200 includes a controller 208 which is utilized to operate the switching as well as the sine and cosine channel inputs of the UUT 302 are operating correctly. The exact angles of a resolver are mimicked (or simulated) with a combination of polarity of the signals and short conditions performed in the switch matrix 304. The switch matrix 304 includes four decks (deck 1-deck 4) that each have eight (8) poles that can be selected. The decks share a common control where if Deck 1 is selecting pole 3, for example, the other three decks (Deck 2-Deck 4) are selecting their respective pole 3. The excitation signal from the UUT 302 is connected to the switching matrix 304 through an isolator 306 which can be, for example, an isolation transformer. Each deck output is connected to a channel leading to a terminal of the sine channel input and the cosine channel input. Similarly to FIG. 2, the excitation signal is supplied to the terminals of the sine and cosine channel inputs in order to mimic angles of a resolver. For example, at 0 degree angle, all the decks are selecting pole 1. This results in a zeroed signal to the sine channel input and a positive excitation to the cosine channel input. The remaining angles for the resolver for testing are shown with reference to Table 2 below.

TABLE 2

| | | Rotatory switch configuration for Sine Channel Port || Rotatory switch configuration for Cosine Channel Port || | |
|---|---|---|---|---|---|---|---|
| Knob position | Pole Number | Deck 1 Indexes Sine Positive pin | Deck 2 Indexes Sine Negative pin | Deck 3 Indexes Cosine Positive pin | Deck 4 Indexes Cosine Negative pin | Sine Channel Input | Cosine Channel Input |
| 0° (360°) | Pole-1 | Deck 2 Position 1 | Deck 1 Position 1 | Excitation+ | Excitation− | Zero (Short) | Excitation+− |

TABLE 2-continued

| | | Rotatory switch configuration for Sine Channel Port | | Rotatory switch configuration for Cosine Channel Port | | | |
|---|---|---|---|---|---|---|---|
| Knob position | Pole Number | Deck 1 Indexes Sine Positive pin | Deck 2 Indexes Sine Negative pin | Deck 3 Indexes Cosine Positive pin | Deck 4 Indexes Cosine Negative pin | Sine Channel Input | Cosine Channel Input |
| 45° | Pole-2 | Excitation+ | Excitation− | Excitation+ | Excitation− | Excitation+− | Excitation+− |
| 90° | Pole-3 | Excitation+ | Excitation− | Deck 4 Position 3 | Deck 3 Position 3 | Excitation+− | Zero (Short) |
| 135° | Pole-4 | Excitation+ | Excitation− | Excitation− | Excitation+ | Excitation+− | Excitation−+ |
| 180° (−180°) | Pole-5 | Deck 2 Position 5 | Deck 1 Position 5 | Excitation− | Excitation+ | Zero (Short) | Excitation−+ |
| 225° (−135°) | Pole-6 | Excitation− | Excitation+ | Excitation− | Excitation+ | Excitation−+ | Excitation−+ |
| 270° (−90°) | Pole-7 | Excitation− | Excitation+ | Deck 4 Position 7 | Deck 3 Position 7 | Excitation−+ | Zero (Short) |
| 315° (−45°) | Pole-8 | Excitation− | Excitation+ | Excitation+ | Excitation− | Excitation−+ | Excitation+− |

In one or more embodiments, the system 300 includes a controller 308 that can be utilized to determine the correct functioning of the UUT 302 by monitoring the excitation signal and the inputs from the sine channel input and the cosine channel input. Optionally, the controller 308 can operate the switching matrix 304 to control the selection of the poles for each deck. In other embodiments, the switch matrix 304 can be manually operated by using a rotary switch operable to rotate the selection mechanism for each deck to select one of the poles. The manual operation can be performed by a technician testing the UUT 302, for example.

The controller 308 can compare the received sine and cosine signal outputs from the switch matrix to what the expected signals would be based on the specified angle of the switching matrix 304. So if the controller 308 is expecting a 90 degree angle but there is a signal received at the cosine channel input, the controller 308 can determine a fault exists in the UUT 302 and alert the technician to repair and/or replace the UUT 302. Otherwise, if the specified angle for the switch matrix 304 matches the expected sine and cosine inputs, the UUT 302 can be presumed to be functioning correctly.

Figure 4:
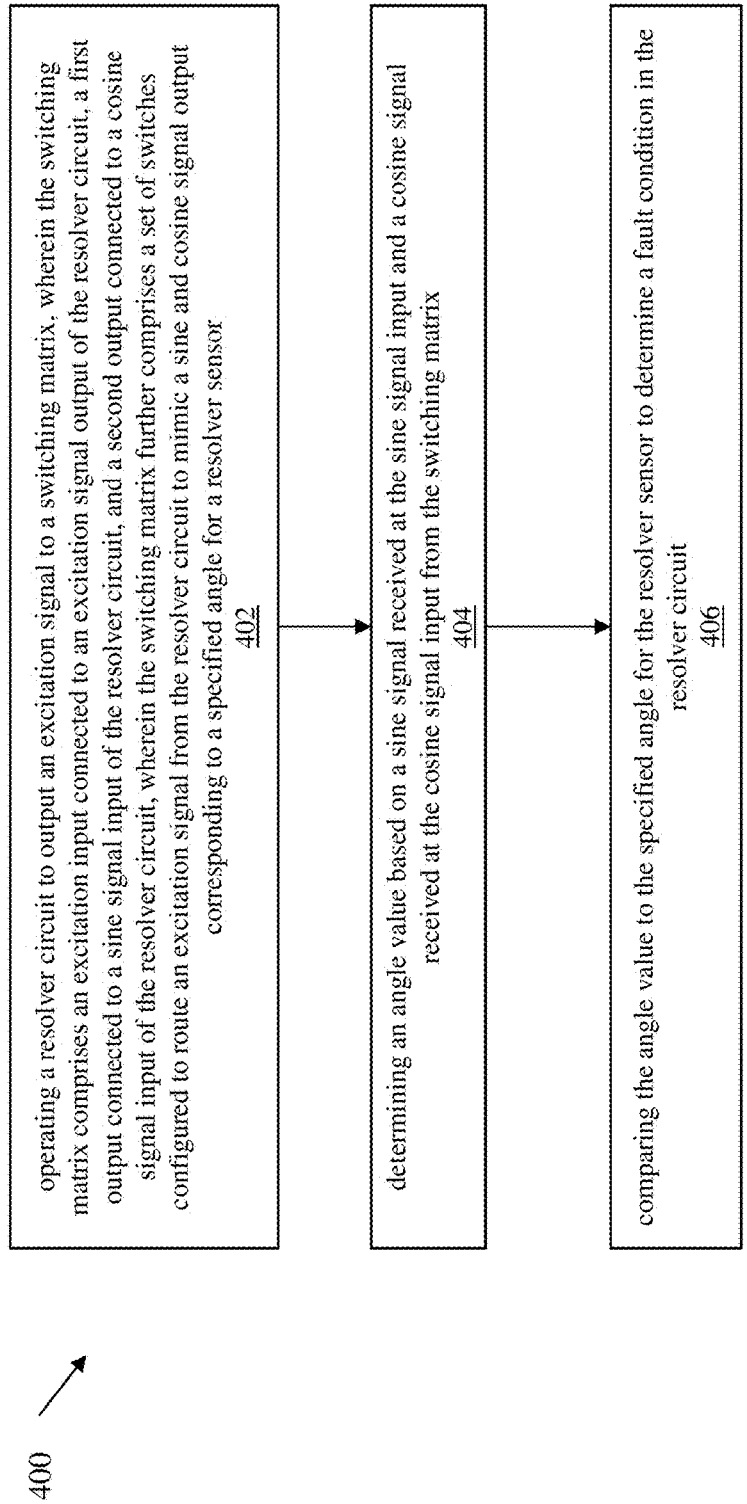
FIG. 4 depicts a flow diagram of a method for testing a resolver interface according to one or more embodiments.

FIG. 4 depicts a flow diagram of a method for testing a resolver circuit according to one or more embodiments. The method 400 includes operating a resolver circuit to output an excitation signal to a switching matrix, wherein the switching matrix comprises an excitation input connected to an excitation signal output of the resolver circuit, a first output connected to a sine signal input of the resolver circuit, and a second output connected to a cosine signal input of the resolver circuit, wherein the switching matrix further comprises a set of switches configured to route an excitation signal from the resolver circuit to mimic a sine and cosine signal output corresponding to a specified angle for a resolver sensor, shown in block 402. Also, the method 400 includes determining an angle value based on a sine signal received at the sine signal input and a cosine signal received at the cosine signal input from the switching matrix, as shown in block 404. And at block 406, the method 400 includes comparing the angle value to the specified angle for the resolver sensor to determine a fault condition in the resolver circuit.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for testing a resolver circuit comprising:
   a resolver circuit comprising an excitation signal output, a sine signal input, and a cosine signal input,
   a switching matrix comprising an excitation input connected to the excitation signal output, a first output connected to the sine signal input, and a second output connected to the cosine signal input, wherein the switching matrix further comprises a set of switches configured to route an excitation signal from the resolver circuit to the first and second outputs to simulate a specified angle for a resolver sensor;
   a controller configured to:
      operate the resolver circuit to output an excitation signal to the switching matrix;

determine an angle value based on a sine signal received at the sine signal input and a cosine signal received at the cosine signal input from the switching matrix;

compare the angle value to the specified angle for the resolver sensor to determine a fault condition in the resolver circuit.

2. The system of claim 1, wherein the specified angle comprises a set of eight test angles.

3. The system of claim 1, wherein the switch matrix operation is controlled by the controller.

4. The system of claim 1, wherein the switch matrix operation is controlled by a manual rotary switch.

5. The system of claim 1, wherein the specified angle is 0 degrees; and wherein the sine signal output comprises zero; and wherein the cosine signal output comprises the excitation signal.

6. The system of claim 1, wherein the specified angle is 135 degrees; and wherein the sine signal output comprises the excitation signal; and wherein the cosine signal output comprises a negative of the excitation signal.

7. The system of claim 1, wherein the specified angle is 270 degrees; and wherein the sine signal output comprises a negative of the excitation signal; and wherein the cosine signal output comprises zero.

8. The system of claim 1, wherein the specified angle is 315 degrees; and wherein the sine signal output comprises a negative of the excitation signal; and wherein the cosine signal output comprises the excitation signal.

9. The system of claim 1, further comprising an isolator connected between the excitation signal output and the excitation input of the switching matrix.

10. The system of claim 9, wherein the isolator comprises an isolation transformer.

11. A method for testing a resolver circuit comprising:

operating a resolver circuit to output an excitation signal to a switching matrix, wherein the switching matrix comprises an excitation input connected to an excitation signal output of the resolver circuit, a first output connected to a sine signal input of the resolver circuit, and a second output connected to a cosine signal input of the resolver circuit, wherein the switching matrix further comprises a set of switches configured to route an excitation signal from the resolver circuit to the first and second outputs to simulate a specified angle for a resolver sensor;

determining an angle value based on a sine signal received at the sine signal input and a cosine signal received at the cosine signal input from the switching matrix; and comparing the angle value to the specified angle for the resolver sensor to determine a fault condition in the resolver circuit.

12. The method of claim 11, wherein the specified angle comprises a set of eight test angles.

13. The method of claim 11, wherein the switch matrix operation is controlled by the controller.

14. The method of claim 11, wherein the switch matrix operation is controlled by a manual rotary switch.

15. The method of claim 11, wherein the specified angle is 0 degrees; and wherein the sine signal output comprises zero; and wherein the cosine signal output comprises the excitation signal.

16. The method of claim 11, wherein the specified angle is 135 degrees; and wherein the sine signal output comprises the excitation signal; and wherein the cosine signal output comprises a negative of the excitation signal.

17. The method of claim 11, wherein the specified angle is 270 degrees; and wherein the sine signal output comprises a negative of the excitation signal; and wherein the cosine signal output comprises zero.

18. The method of claim 11, wherein the specified angle is 315 degrees; and wherein the sine signal output comprises a negative of the excitation signal; and wherein the cosine signal output comprises the excitation signal.

19. The method of claim 11, wherein an isolator is connected between the excitation signal output and the switching matrix.

20. The method of claim 19, wherein the isolator comprises an isolation transformer.

* * * * *